(12) United States Patent
Chan et al.

(10) Patent No.: US 7,594,638 B2
(45) Date of Patent: Sep. 29, 2009

(54) FOOT STAND ASSEMBLY WITH MULTI-VIEWING ANGLES

(75) Inventors: Kwai Nam Michael Chan, Hong Kong (HK); Chun Hui Wiley Zhang, Shenzhen (CN); Sin Hui Cheah, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 526 days.

(21) Appl. No.: 11/455,443

(22) Filed: Jun. 19, 2006

(65) Prior Publication Data

US 2007/0012856 A1 Jan. 18, 2007

(30) Foreign Application Priority Data

Jun. 30, 2005 (EP) .................................. 05300539

(51) Int. Cl.
*F16M 1/00* (2006.01)
(52) U.S. Cl. .................................... 248/677; 248/188.8
(58) Field of Classification Search ................ 248/677, 248/309.1, 688, 455, 188.8, 681, 683, 590, 248/592, 594, 599, 615, 171, 565, 576, 593, 248/673, 525, 538, 137; 361/681, 683, 814; 16/429, 438
See application file for complete search history.

(56) References Cited

U.S. PATENT DOCUMENTS

| 5,396,399 | A  | * | 3/1995 | Blair et al. .................... 361/681 |
| 5,504,813 | A  | * | 4/1996 | Takasaki ................ 379/433.13 |
| 6,880,796 | B2 | * | 4/2005 | Khor et al. ................... 248/677 |
| 7,364,126 | B2 | * | 4/2008 | Tsai et al. ................. 248/188.8 |
| 2005/0056765 | A1 |  | 3/2005 | Khor et al. |
| 2005/0218978 | A1 | * | 10/2005 | Liu et al. ..................... 330/114 |
| 2007/0164191 | A1 | * | 7/2007 | Kim ........................... 248/686 |

OTHER PUBLICATIONS

European Search Report.

* cited by examiner

*Primary Examiner*—J. Allen Shriver, II
*Assistant Examiner*—Erin Smith
(74) *Attorney, Agent, or Firm*—Robert D. Shedd; Harvey D. Fried; Patricia Verlangier

(57) ABSTRACT

An auto-eject foot stand assembly with multi-viewing angles for a visual device includes a foot having an axle perpendicular to the foot. The axle rotatably extends in a bracket. A gear is securely provided outside the axle and between the bracket and the foot. A spring is provided between the gear and the bracket. An elasticity plate is engaged with the gear. A locker is pivotally mounted on the bracket and operated by a metal spring plate to lock the gear. When the metal spring plate is pressed, the gear is released from the locker and the foot can be ejected under the elastic force of the spring. By the engagement between the gear and elasticity plate, the foot can be rotated and positioned at various desired viewing angels.

15 Claims, 5 Drawing Sheets

FOOT STAND ASSEMBLY WITH MULTI-VIEWING ANGLES

This application claims the benefit, under 35 U.S.C. § 119 of European Patent Application 05300539.3 filed Jun. 30, 2005.

FIELD OF THE INVENTION

The present invention relates to a foot stand assembly for a personal media player, and more particularly to a foot stand assembly which car be ejected by pressing a button and allowed to be rotated in a multiple-angle for different viewing position.

BACKGROUND OF THE INVENTION

A personal media player (PMP) provides convenience for a viewer to enjoy AV images. However, the viewing angle of the conventional PMP can not be adjusted according to a viewer's desire when the PMP is disposed at a situation. Thus, it is very inconvenient for a viewer to move his head upwards or downwards to find out the best viewing angle.

Therefore, an improved PMP is desired to solve this problem.

SUMMARY OF THE INVENTION

A foot stand assembly for a visual device in accordance with the present invention is provided to allow the visual device to be adjusted with multi-viewing angles.

According to the invention, a foot stand assembly comprises a foot having an axle perpendicular to the foot. A bracket has a first sidewall perpendicular to the axle and with an axle hole through which the axle rotatably extends, and a second sidewall parallel to the axle and with a notch facing the foot. A gear is securely provided outside the axle and between the first sidewall and the foot. The gear has multiple teeth formed around an outer circumference of the gear. A spring is provided outside the axle and between the first sidewall and the gear. A bearing is rotatably provided outside the axle and between the gear and the foot. A ring is fastened on a free end of the axle extending out from the axle hole to prevent the axle from escaping from the first sidewall of the bracket. An elasticity plate is provided above the gear and has a retaining catch formed at a bottom surface of the elasticity plate and engaged with the teeth. A locker is pivotally mounted on the second sidewall and has a finger aligned with the notch to lock the gear. A metal spring plate is provided above the locker for pushing the finger to lock the gear. Whereby, when the locker is operated to release the finger, the gear is escaped from the locker and the foot is ejected under the elastic force of the spring. By the engagement between the gear and elasticity plate, the foot can be rotated and positioned at various desired viewing angels.

In an embodiment, the gear has a brass core securely provided in a central portion of the gear and extending through the bearing. The brass core has at least one cut defined at an end facing the foot; and the axle has at least one key formed adjacent the foot and received in the at least one cut.

In another embodiment, the locker has a first arm slightly extending upwards and a second arm substantially parallel to the second sidewall of the bracket, wherein the finger is formed on the second arm. A pin aperture is defined between the first arm and second arm. A barrel with a pin hole is formed in the second sidewall of the bracket. A pin is inserted through the pin aperture and pin hole to pivotally mount the locker on the barrel. The pin hole has two lugs formed at a top edge thereof and welded with the pin for preventing the pin from escaping from the barrel.

Preferably, the metal spring plate has a lateral portion, an upright portion integrated with the lateral portion, and a tongue formed beneath the lateral portion and abutting the second arm of the locker. Advantageously, a pad cork is fitted in the metal spring plate between the inner surface of the tongue and inner surface of the housing in order to enhance the spring force and extend the endurance limit.

DETAIL DESCRIPTION OF PREFERRED EMBODIMENTS

Figure 1:
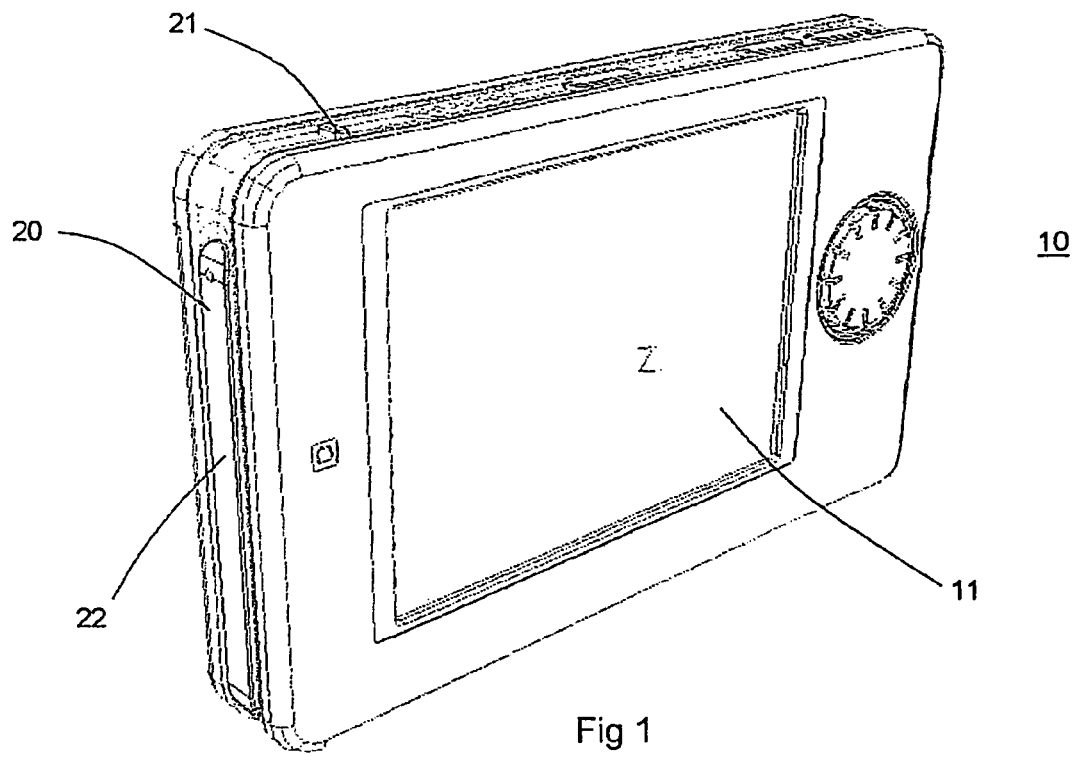
FIG. 1 is a perspective view of a personal media player (PMP) provided with a foot stand assembly in accordance with the present invention.
Figure 2:
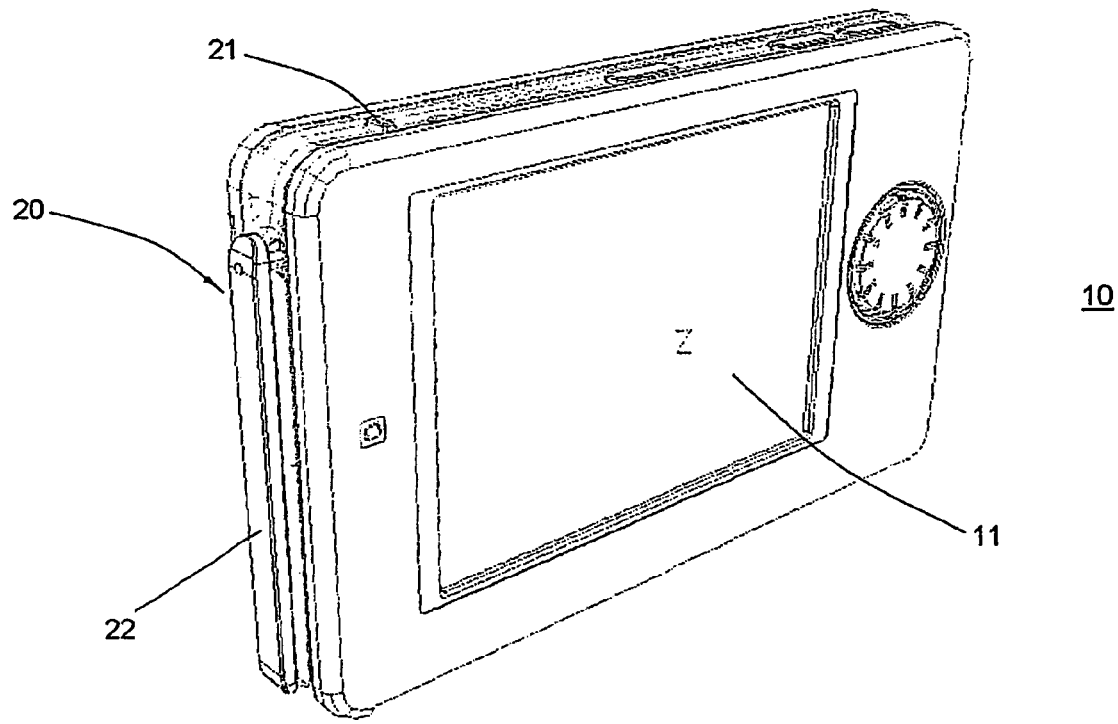
FIG. 2 is a perspective view of the PMP in FIG. 1 in a status of the foot stand assembly being ejected.
Figure 3:
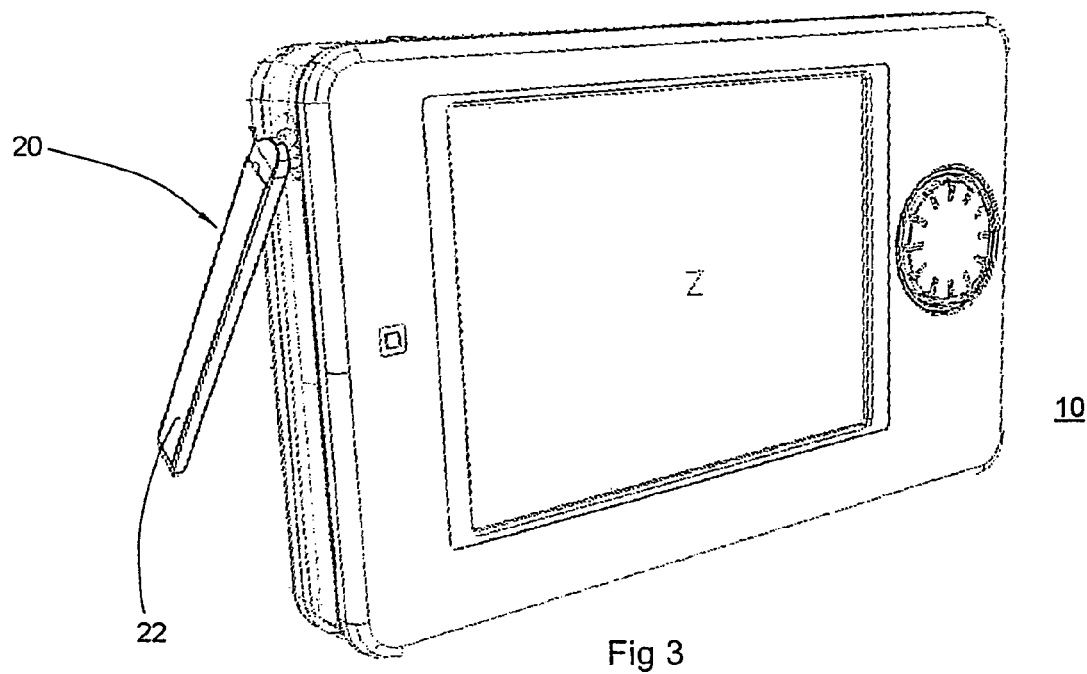
FIG. 3 a perspective view of the PMP in FIG. 1 in a status of the foot stand assembly being rotated.
Figure 4:
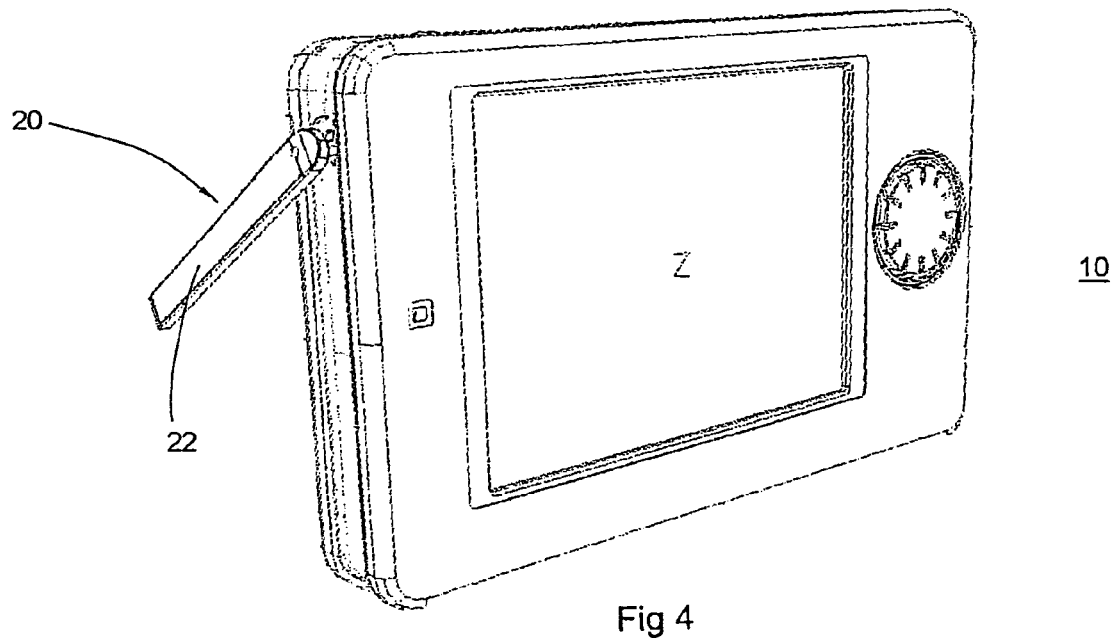
FIG. 4 is a perspective view of the PMP in FIG. 1 in a status of the foot stand assembly being rotated further.
Figure 5:
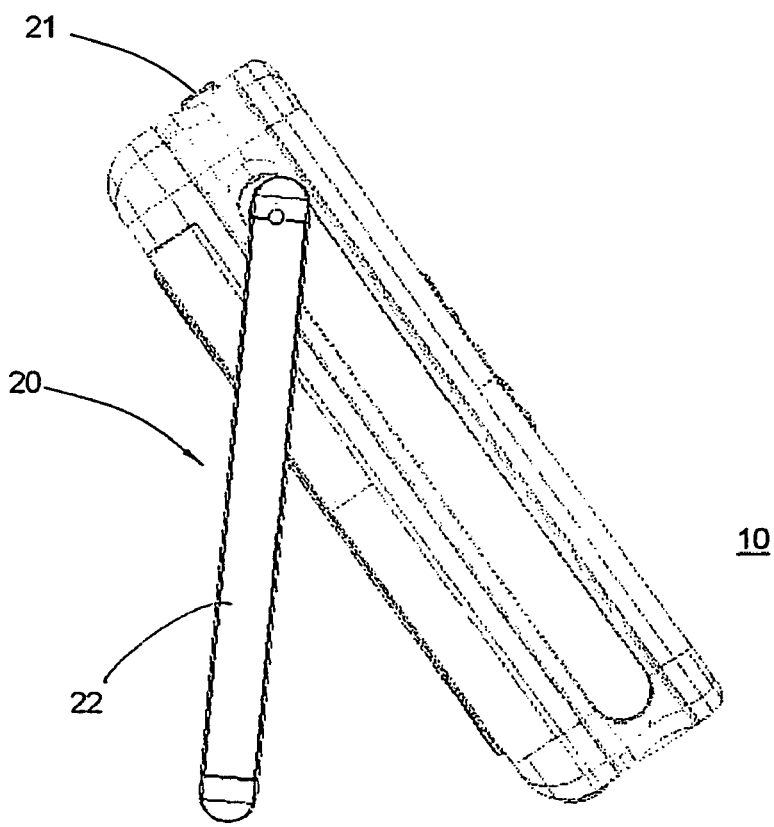
FIG. 5 a side view of the PMP in FIG. 1 being supported by the foot stand assembly with a small inclined angle.
Figure 6:
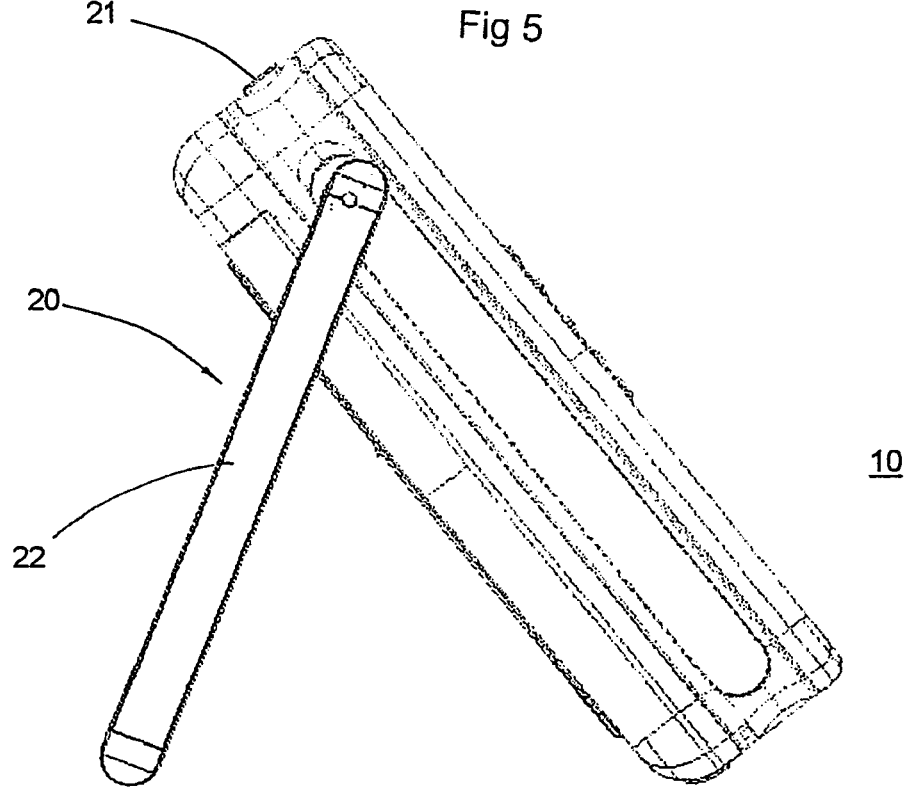
FIG. 6 is a side view of the PMP in FIG. 1 being supported by the foot stand assembly with a large inclined angle.

With reference to FIGS. 1-2, a personal media player 10 generally includes a housing (not numbered) with a display 11 provided in a front side thereof.

A foot stand assembly 20 in accordance with the present invention is installed at a left side of the personal media player 10. A button 21 is provided on the top side for operating the stand foot 20. When the button 21 is pressed down, a foot 22 of the foot stand assembly 20 can be automatically ejected out from a recess defined in the left side of the housing, as illustrated in FIG. 2. Then, the foot 22 can be rotated to support the PMP 10 with various viewing-angles, as illustrated in FIGS. 3-6.

Figure 7:
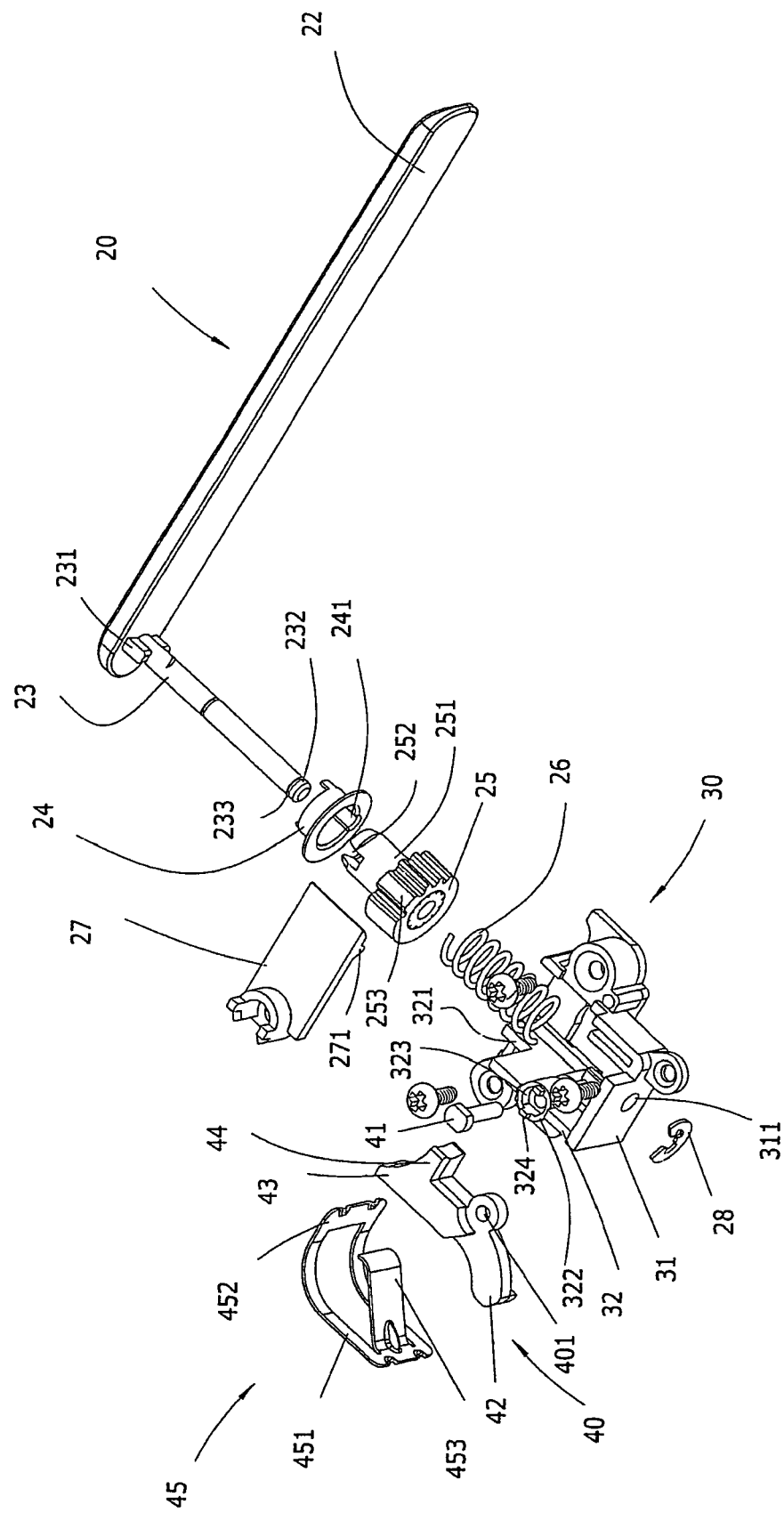
FIG. 7 is an exploded perspective view of the foot stand assembly in accordance with the present invention.
Figure 8:
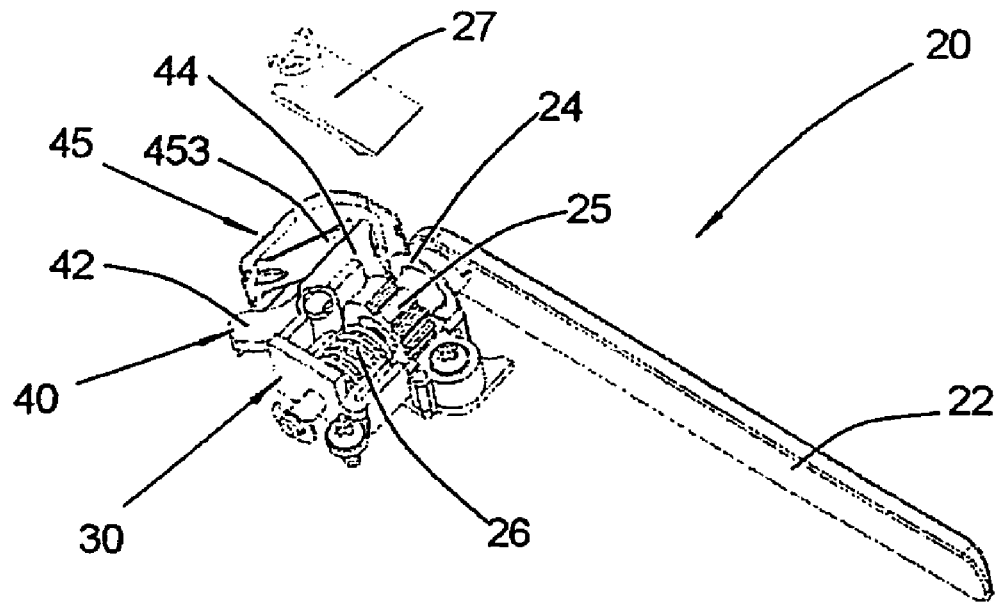
FIG. 8 is a perspective view of the foot stand assembly in a partially assembled status.
Figure 9:
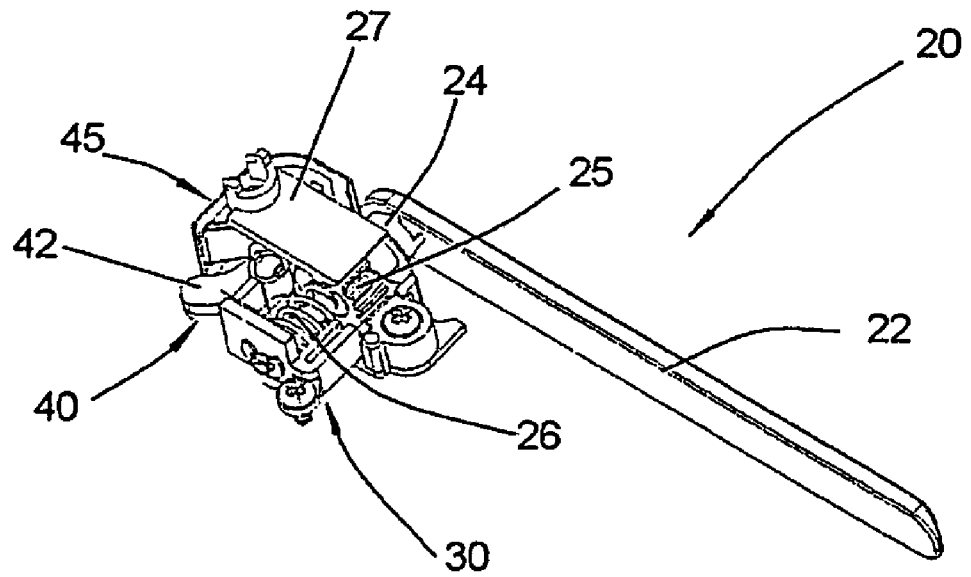
FIG. 9 is a perspective view of the foot stand assembly in an assembled status.

With reference to FIGS. 7-9, an axle 23 extending perpendicular to the foot 22 is provided. A bracket 30 is mounted in the housing of the PMP 10 by means of plurality fasteners, and the axle 23 is rotatably mounted on the bracket 30.

The bracket 30 has a first sidewall 31 and a second sidewall 32, wherein the first sidewall 31 is perpendicular to the axle 23, and the second sidewall 32 is parallel to the axle 23. An axle hole 311 is defined through the first sidewall 31 for the axle 23 extending therethrough. A notch 321 facing the foot 22 is defined in the second sidewall 32.

A bearing 24, a gear 25 and a spring 26 are in turn provided outside the axle 23 and between the foot 22 and the first sidewall 31. The bearing 24 has a protrusion 241 (appeared as a groove in an inner wall of the bearing 24) formed at an outer periphery for positioning the bearing 24 in the housing of PMP 10 to disable the bearing 24 to rotate about the housing.

The gear 25 is formed with teeth 253 around an outer circumference thereof entirely or partly. A brass core 251 has a first end thereof securely provided in a central portion of the gear 25 and a second end thereof operatively extending through the bearing 24. The brass core 251 has two cuts 252 defined at an end thereof facing the foot 22. Two keys 231 are formed on the axle 23 and respectively received in the cuts 252 to enable the axle 23 to rotate along with the gear 25. The spring 26 is provided between the gear 25 and the first sidewall 31 of the bracket 30.

An elasticity plate 27 is provided above the gear 25 and has a retaining catch 271 formed at a bottom surface of the elasticity plate 27 and engaged with the teeth 253 of the gear 25. By engaging the retaining catch 271 with different teeth 253, the foot 22 can be positioned at corresponding angles to support the PMP at various viewing-angles.

The axle 23 has a free end 232 extending through the axle hole 311 and an annular recess 233 defined at the free end 232. A ring 28 is secured in the annular recess 233 to prevent the axle 23 from escaping from the bracket 30.

A barrel 322 with a pin hole 323 is formed in the second sidewall 32. A locker 40 has a pin aperture 401 defined at a middle portion thereof. A pin 41 is inserted through the pin aperture 401 and the pin hole 323 to pivotally mount the locker 40 on the barrel 322. Two lugs 324 are formed at a top edge around the pin hole 323. After the pin 41 is inserted in the pin hole 323, the lugs 324 are welded with the pin 41 to fasten the pin 41 in the barrel 322.

The locker 40 has a first arm 42 slightly extending upwards and a second arm 43 substantially parallel to the second sidewall 32 of the bracket 30. The pin aperture 401 is defined between the first arm 42 and the second arm 43. A finger 44 is formed on the second arm 43 and aligned with the notch 321.

A metal spring plate 45 is provided above the locker 40 and includes a lateral portion 451, an upright portion 452 integrated with the lateral portion 451, and a tongue 453 formed beneath the lateral portion 451. A pad cork (not shown) is advantageously fitted in the metal spring plate between the inner surface of the tongue and inner surface of the housing in order to enhance the spring force and extend the endurance limit. The second arm 43 of the locker 40 is elastically pushed by the tongue 453 of the metal spring plate 45 to extend the finger 44 into the notch 321. The gear 25 is pushed towards the foot 22 by the spring 26 and surely locked by the finger 43 extending through the notch 321. In this case, the foot 22 is closed to the left side of the PMP 10, as illustrated in FIG. 1.

The first arm 42 is connected to the button 21 (shown in FIG. 1) by a connecting means (not shown in the drawings). When the button 21 is operated, the first arm 42 is pressed to pivot the first arm 42 downwards so as to release the finger 44 from the gear 25. Under the elastic force of the spring 26, the gear 25, bearing 24 and foot 22 are automatically ejected, as illustrated in FIG. 2. Then, the foot 22 can be rotated and positioned at various view-angles according to the engagement of the elasticity plate 27 and the gear 25, as illustrated in FIGS. 3-6.

When retracting the ejected foot 22, the foot 22 is returned to its original position parallel to the recess defined in the housing and then retracted into the recess defined by simply pressing the foot 22 towards the housing. The gear 25 is urged against an incline end surface defined on the second arm 43 under the pressing force till it is retracted to the original position, in which the finger 44 is pushed back to lock position by the resilient force of the tongue 453. Thus the locker 40 is pivoted back to the original status so as to lock the gear 25 again.

Even though numerous characteristics and advantages of the present invention have been set forth in the foregoing description, together with details of the structure and function of the invention; the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An foot stand assembly for a visual device, wherein the foot stand assembly comprises
    a foot having an axle perpendicular to the foot;
    a bracket in which the axle rotatably extends;
    a gear securely provided outside the axle and between the bracket and the foot, the gear having multiple teeth formed around an outer circumference of the gear;
    a spring provided outside the axle and between the bracket and the gear; and
    a locker pivotally mounted on the bracket and having a finger extending in the bracket to lock the gear so that when the finger is released from the gear, the gear and the foot are automatically ejected under the elastic force of the spring.

2. The foot stand assembly as claimed in claim 1, wherein the bracket has a first sidewall perpendicular to the axle and with an axle hole through which the axle rotatably extends, and a second sidewall parallel to the axle and with a notch facing the foot.

3. The foot stand assembly as claimed in claim 1, wherein the foot stand assembly further comprises a bearing rotatably provided outside the axle and between the gear and the foot.

4. The foot stand assembly as claimed in claim 2, wherein the foot stand assembly further comprises a ring fastening on a free end of the axle extending out from the axle hole to prevent the axle from escaping from the first sidewall.

5. The foot stand assembly as claimed in claim 1, wherein the gear has a brass core securely provided in a central portion of the gear and extending through the bearing.

6. The foot stand assembly as claimed in claim 5, wherein the brass core has at least one cut defined at an end facing the foot; and the axle has at least one key formed adjacent the foot and received in the at least one cut.

7. The foot stand assembly as claimed in claim 1, wherein the outer circumference of the gear is entirely formed with the teeth.

8. The foot stand assembly as claimed in claim 1, wherein the outer circumference of the gear is partly formed with the teeth.

9. The foot stand assembly as claimed in claim 2, wherein the locker has a first arm slightly extending upwards and a second arm substantially parallel to the second sidewall of the bracket, wherein the finger is formed on the second arm.

10. The foot stand assembly as claimed in claim 9, wherein the locker has a pin aperture defined between the first arm and the second arm; a barrel with a pin hole is formed in the second sidewall of the bracket; and a pin is inserted through the pin aperture and pin hole to pivotally mount the locker on the barrel.

11. The foot stand assembly as claimed in claim 10, wherein the pin hole has two lugs formed at a top edge thereof and welded with the pin for preventing the pin from escaping from the barrel.

12. The foot stand assembly as claimed in claim 9, wherein the metal spring plate has a lateral portion, an upright portion integrated with the lateral portion, and a tongue formed beneath the lateral portion and abutting the second arm of the locker.

13. The foot stand assembly as claimed in claim 12, wherein a pad cork is fitted in the metal spring plate between the inner surface of the tongue and inner surface of the housing.

14. The foot stand assembly as claimed in claim 1, further comprising a metal spring plate for pushing the finger to lock the gear.

15. The foot stand assembly as claimed in claim 1, further comprising an elasticity plate having a retaining catch formed at a bottom surface of the elasticity plate and engaged with one of the multiple teeth.

* * * * *